(No Model.) 2 Sheets—Sheet 1.

J. B. FROST.
GRAIN CUTTING MACHINE.

No. 302,993. Patented Aug. 5, 1884.

WITNESSES:
V. H. Ernst
C. Sedgwick

INVENTOR:
J. B. Frost
BY Munn & Co
ATTORNEYS.

(No Model.)  2 Sheets—Sheet 2.

J. B. FROST.
GRAIN CUTTING MACHINE.

No. 302,993.  Patented Aug. 5, 1884.

WITNESSES:
V. H. Ernst.
C. Sedgwick

INVENTOR:
J. B. Frost
BY Munn & Co.
ATTORNEYS.

UNITED STATES PATENT OFFICE.

JOHN BENJ. FROST, OF CUYAHOGA FALLS, OHIO.

GRAIN-CUTTING MACHINE.

SPECIFICATION forming part of Letters Patent No. 302,993, dated August 5, 1884.

Application filed April 29, 1884. (No model.)

*To all whom it may concern:*

Be it known that I, JOHN B. FROST, of Cuyahoga Falls, in the county of Summit and State of Ohio, have invented a new and Improved Grain-Cutting Machine, of which the following is a full, clear, and exact description.

This invention pertains to improvements in grain-cutting machines; and it consists of the combinations of parts and their construction, substantially as herein shown and described.

Reference is to be had to the accompanying drawings, forming part of this specification, in which similar letters of reference indicate corresponding parts in all the figures.

Figure 1:
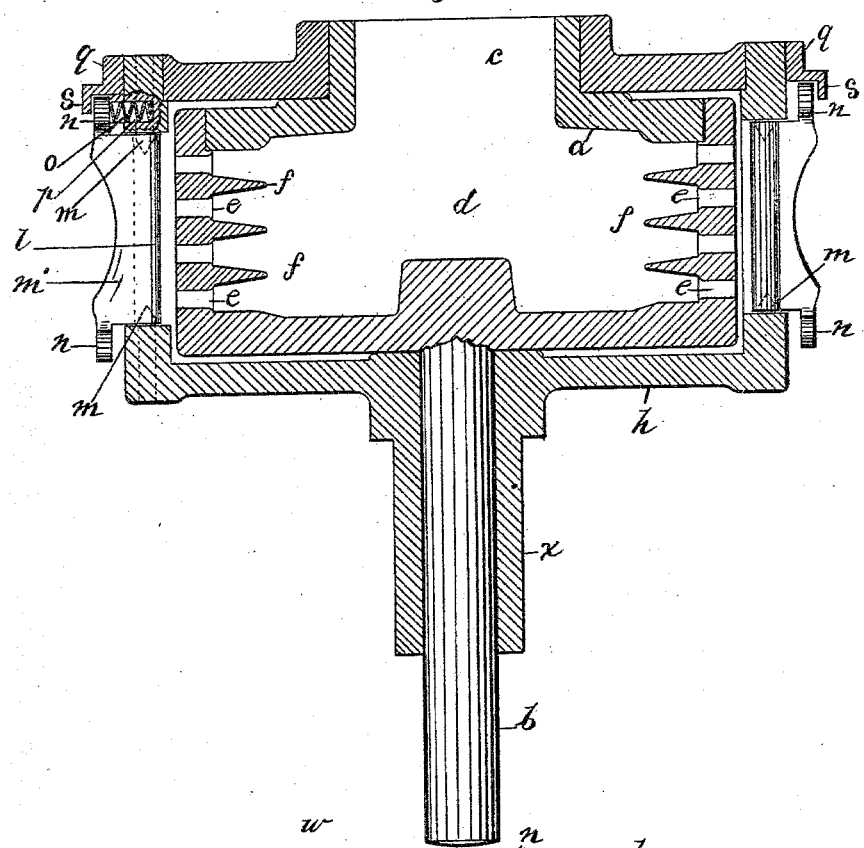
Figure 2:
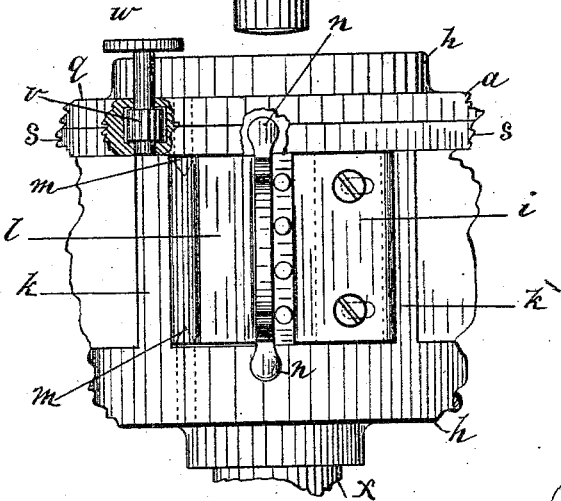
Figure 3:
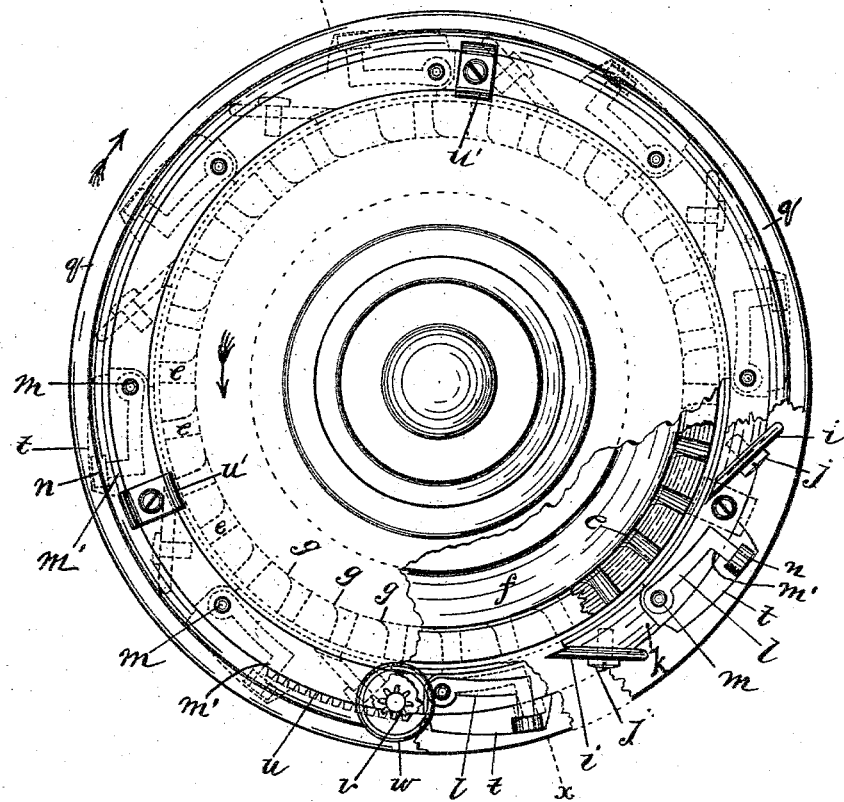
Figure 4:
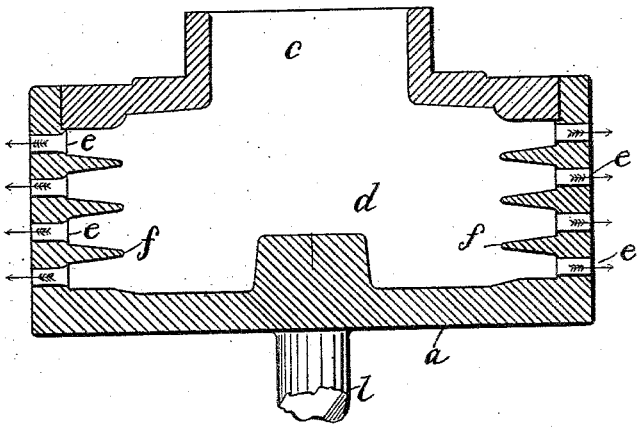

Figure 1 is a sectional elevation of my improved grain-cutter on line $xx$ of Fig. 3. Fig. 2 is a side elevation of a portion of the same. Fig. 3 is a top view with some parts broken out, and Fig. 4 is a sectional elevation of the feeding-drum separated from the cutting-drum.

I construct a hollow feeding-drum, $a$, with a vertical spindle on the lower side for mounting it, so as to be revolved on its axis, said drum having a large central opening, $c$, through which to supply the grain to the interior space, $d$; also a series of circumferential rows of holes, $e$, and a series of inwardly-projecting flanges, $f$, between the several rows of holes, the holes being for the discharge of the grain through the rim of the drum, and the flanges being to divide the grain and deliver it to the holes better than if the rim were flat transversely between the holes, on which the grain could lodge and choke the holes. I also countersink the holes on the rear side with relation to the way the drum turns, as shown at $g$, Fig. 3, which facilitates the feeding of the grain. Around this drum, which is to be geared to turn—say to the left hand—I arrange another drum, $h$, which is to be revolved in the reverse direction, for carrying cutters $i$ to cut the grain issuing from the feeding-drum into short pieces, said cutters being set obliquely to the periphery of the feeding-drum, in the manner of the plane-bits of wood-planes, with the edges set in close proximity to the face of the feeding-drum, and secured adjustably by set-screws $j$, for regulating them, and placed at short distances apart on cross-bars $k$ of the rim of the cutter-drum $h$, between which cross-bars said rim is constructed with openings in which to arrange said cutters, and also to arrange adjustable gage-plates $l$ in advance of the cutters for controlling the extent of the projection of the grain from the holes at the time the cutters reach them. These gage-plates are pivoted between the walls of the ends of the openings in the rim $h$ at $m$, with the free edges extending backward nearly to the edges of the cutters, and having radial flanges $m'$ extending outward beyond the periphery of the drum, and provided with extension-lugs $n$ at the ends, for the end bearings of springs $o$, that are fitted in radial sockets $p$ of the drum, to press out the gages to the limit of their range, which is controlled by a shifting ring, $q$, fitted on the end of the drum $h$, and having a flange, $s$, which overlaps lugs $n$ of one end of the guard-flanges, to control them by shifting forward or backward around the drum a short distance each way. The inner periphery of said flange $s$ has inclines $t$ for the guards that draw the gages inward when shifted one way, and allow them to be passed outward by the springs when shifted the other way. This ring is held in its position on the drum $h$ by the cleats $u'$, screwed onto the upper side of the drum, and overlapping the ring. For shifting the ring $q$ it is constructed with a short toothed segment, $u$, and a pinion, $v$, fitted on the knob-spindle $w$, which is suitably arranged in the drum to gear with said segment and turn the ring, as required, by turning the knob.

The drum $h$ has a tubular spindle, $x$, by which it is to be mounted and driven, and in which the spindle $b$ of the feeding-drum is fitted for its support, and which has an extension below the end of spindle $x$ for attaching the driving-gear.

Having thus described my invention, I claim as new and desire to secure by Letters Patent—

1. The combination of the revolving hollow feeding-drum $a$, having apertures $e$ through the rim, and the reversely-revolving cutter-drum $h$, having cutters $i$, substantially as described.

2. The combination of the revolving hollow feeding-drum $a$, having apertures $e$ through the rim, and the revolving cutter-drum $h$, having cutters $i$ and gages $l$, substantially as described.

3. The combination of the revolving hollow feeding-drum $a$, having apertures $e$ and flanges $f$, and the revolving cutter-drum $h$, having cutters $i$, substantially as described.

4. The combination of the revolving hollow feeding-drum $a$, having apertures $e$ and flanges $f$, and the revolving cutter-drum having cutters $i$ and gages $l$, substantially as described.

5. The combination, with gages $l$, arranged on pivots $m$ and having bearing-lugs $n$, of springs $o$, and the shifting flange-ring $q$, having inclines $t$, substantially as described.

6. The combination of hollow revolving drum $a$, having apertures $e$ countersunk on the rear side relatively to the direction of the motion of said drum, with the revolving cutter-drum $h$, having cutters $i$, substantially as described.

JOHN BENJ. FROST.

Witnesses:
W. M. GRISWOLD,
G. C. UPSON.